«12» United States Patent
Van Bosch

(10) Patent No.: US 7,239,883 B2
(45) Date of Patent: Jul. 3, 2007

(54) EMERGENCY CALLING WITH A GSM RADIOTELEPHONE

(75) Inventor: James A. Van Bosch, Crystal Lake, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 223 days.

(21) Appl. No.: 10/876,006

(22) Filed: Jun. 24, 2004

(65) Prior Publication Data

US 2005/0288051 A1  Dec. 29, 2005

(51) Int. Cl.
*H04B 7/00* (2006.01)
*H04Q 7/20* (2006.01)

(52) U.S. Cl. .............. 455/521; 455/404.1; 455/411; 455/433; 455/445; 455/456.2; 455/555; 455/557; 455/558; 379/45; 379/433.09

(58) Field of Classification Search .............. 455/521, 455/555, 557, 558, 404.1, 411, 433, 445, 455/456.2; 379/433.09, 44, 45; 380/247, 380/248, 249; 703/24
See application file for complete search history.

(56) References Cited

U.S. PATENT DOCUMENTS 6,339,370 B1* 1/2002 Ruhl et al. ............ 340/436
6,501,949 B1 12/2002 Singleton
6,799,155 B1* 9/2004 Lindemann et al. ........ 703/24
2004/0046637 A1* 3/2004 Wesby Van Swaay ....... 340/5.1
2004/0233930 A1* 11/2004 Colby, Jr. ................ 370/464

FOREIGN PATENT DOCUMENTS

WO    WO 01/28293 A1    4/2001

OTHER PUBLICATIONS

Siemens: "AC45 Hardware Interface Description", Version: 01.01a, Date: Apr. 29, 2003, Docld: AC45_HD_V01.01a, Status: Released, pp. 1-75.
Sony Ericsson: "GM41/GM42 Create One Application and Take On the World", LZT123 7474 RIA, www.SonyEricsson.com, unknown.

* cited by examiner

*Primary Examiner*—Nick Corsaro
*Assistant Examiner*—Shaima Q. Aminzay
(74) *Attorney, Agent, or Firm*—Gary J. Cunningham

(57) ABSTRACT

An apparatus and method for allowing emergency calling with a Global System for Mobile (GSM) radiotelephone during temperature extremes includes a Subscriber Identification Module (SIM) card, a temperature sensor; and a controller that detects when the radiotelephone has a SIM card error, whereupon the controller obtains a temperature measurement from the temperature sensor. If it is found that the temperature measurement is outside of an operating temperature range of the SIM card, the controller permits the radiotelephone to make an emergency calls only.

25 Claims, 2 Drawing Sheets

EMERGENCY CALLING WITH A GSM RADIOTELEPHONE

FIELD OF THE INVENTION

Generally, this invention relates to communication devices which use subscriber identification module (SIM) cards, and more specifically, to a method and apparatus for permitting emergency calling when the SIM card is subject to temperature extremes.

BACKGROUND OF THE INVENTION

In current communication device systems such as the Global System for Mobile Communications (GSM) radiotelephone system, a SIM card is inserted into a radiotelephone for providing subscriber identification, billing information and other information concerning the operation of the communication device. Before allowing any non-emergency call the radiotelephone must detect a SIM card inserted therein. If no SIM card is detected then no non-emergency calls are allowed. However, in accordance with existing GSM standards, SIM cards need only be operable within a temperature range of −25° C. to 70° C. with occasional peaks up to +85° C. Therefore, a SIM card may not be detected in the radiotelephone when the radiotelephone is located in a temperature environment outside of the normal −25° C. to 70° C. temperature range. Thus, the SIM card is the limiting factor in automotive grade radiotelephone's designed to work from −40° C. to +85° C.

Although it is unlikely that a user and/or communication device would be in an over 70° C. environment, it is quite common in colder climates for a user to be in a less than −25° C. environment, which would prevent their being able to use the radiotelephone, in an emergency or otherwise. For example, a user entering a vehicle utilizing a GSM radiotelephone system in a cold climate during winter may not be able to use their phone. If there is an emergency situation in this case, which can be dangerous given the temperature, it is highly desirable that the radiotelephone work even if the SIM card is inoperable.

The above problem is becoming an increasing concern as more and more GSM systems are being incorporated into onboard Telematics communications systems for vehicles. Existing systems do not address the temperature issues and behave the same as their portable counterparts. For example, in one system an inoperable SIM card will generate an error message, but take no other action in order to recover from the error, regardless of temperature. In this case, the radiotelephone must continually be turned on and off in an attempt to recover. In another system, a controller may recognize that a SIM card is inserted, but if the SIM card is inoperable, the controller will place itself in an endless reset loop. In yet another system, the radiotelephone may immediately switch off if a temperature extreme condition is encountered and the unit is not in the middle of an emergency call. Once the emergency call is ended the unit will then immediately switch off if a temperature extreme condition is still encountered. In all of these prior solutions, there is no controlled recovery mode for returning the radiotelephone to normal service.

What is needed is an apparatus and method to detect those times when a SIM card in a communication device is inoperable due to temperature extremes and affect the means to return the radiotelephone to normal service. It would also be of benefit to allow emergency calling at extended automotive temperature ranges when it is found that the SIM card is inoperable due to temperature extremes. Further, it is desirable to provide this protection with a minimal change of software and hardware.

SUMMARY OF THE INVENTION

An apparatus and method for allowing emergency calling with a Global System for Mobile (GSM) radiotelephone during temperature extremes includes a Subscriber Identification Module (SIM) card, a temperature sensor; and a controller that detects when the radiotelephone has a SIM card error, whereupon the controller obtains a temperature measurement from the temperature sensor. If it is found that the temperature measurement is outside of an operating temperature range of the SIM card, the controller permits the radiotelephone to make an emergency calls only.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides an apparatus and method to detect those times when a SIM card in a communication device is inoperable due to temperature extremes. In such a case, the communication device is allowed to make or continue an emergency call. In addition, the present method provides a controlled recovery process to return the radiotelephone to normal service. The above advantages are accomplished with a minimal change of operating instructions and additional hardware. In this way, cost is minimized.

Figure 1:
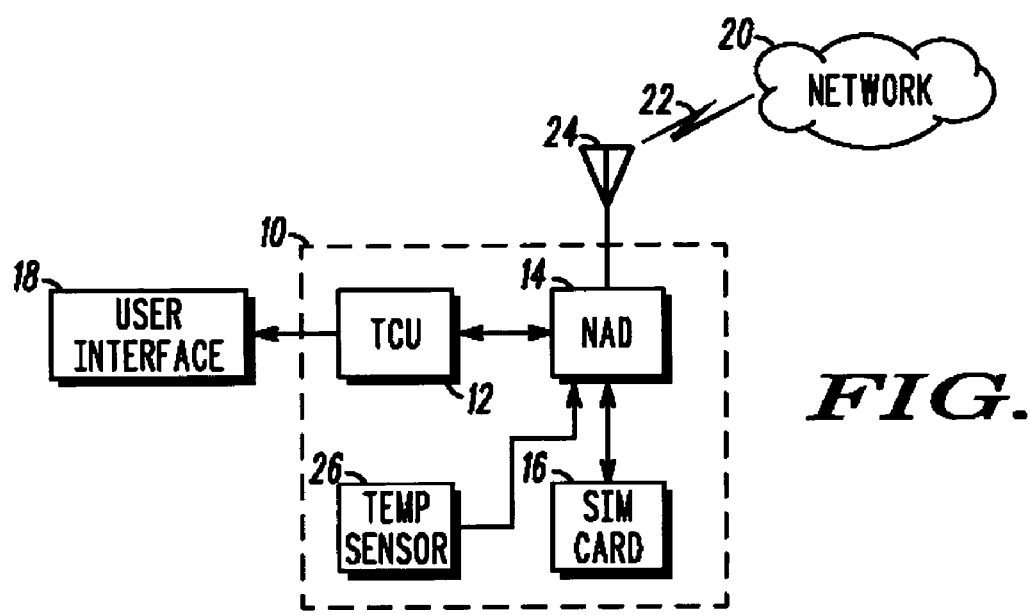
FIG. 1 shows a block diagram of a system overview, in accordance with the present invention.

FIG. 1 illustrates apparatus for allowing emergency calling with a Global System for Mobile (GSM) radiotelephone during temperature extremes, in accordance with the present invention. In the apparatus, a GSM communication device 10 is coupled with an internal or external user interface 18, one or more SIM cards 16, and at least one temperature sensor 26, preferably located in proximity to the SIM card(s). The user interface 18 is used to convey information between a user and the communication device 10, and typically includes a microphone, a speaker, a display, a data port and a keypad, for example. A portable radiotelephone is one example of the communication device 18. Alternatively, as shown and in the examples below, the communication device 10 can be a vehicular radiotelephone system incorporating a Telematics Control Unit (TCU) that provides control over a GSM Network Access Device (NAD), which provides radiotelephone capabilities for the vehicle. In either case the SIM card contains personalized information for a user, as is known in the art.

Before power-up of the communication device 10, a SIM card 16 is inserted into a card reader contained within the communication device 10. This can be done by a field service technician or an end user. In vehicular application, a replaceable SIM card is provide to a user for personal preferences, and a separate SIM card is kept on-board the vehicle (i.e., in the trunk) that contains particular vehicular information. In one example, upon turn-on, the communication device 10 prompts the user through the user interface 18 (e.g., display and/or keyboard) to insert a personal identification number (PIN) to unlock the SIM card allowing access to the subscriber information contained therein. In another example, the SIM card may not require the entry of a PIN number to unlock the subscriber information contained therein. After successfully completing the turn-on process, the communication device 10 is fully registered for service in its native operating network 20 and system. The communication device 10 is now able to send and receive RF signals 22 through its antenna 24 with the network 20, as is known in the art. It should be recognized that there are many other components (e.g., memory, etc.) of the communication device, as are known in the art, that are not shown for simplicity. It should also be recognized that the SIM card itself can take on various configurations known in the art, such as a smart card, without affecting the operability of the present invention.

On power up, the radiotelephone (i.e., TCU 12) checks for the presence of a SIM card. For example, the TCU can read a SIM card register to check and see if the SIM card is present. This check can be done occasionally, a few seconds or more, to check to see that the SIM card is still present, has not lost connection, and is functional. If the SIM card can not be read from, then this indicates that the card is not present or inoperable. It should be recognized that the apparatus and method of the present invention can be adapted to not only a SIM card but any electronic module that attaches to a communication device.

One case of concern in the present invention is where the SIM card is inoperable due to extreme temperature (e.g., outside of −25° C. to 70° C.). Typically, this is because the SIM card deforms so much that it breaks electrical contact with the SIM connector. In addition, the SIM card(s) can stop working due to electrical issues. If the NAD 14 determines that the SIM card 16 is inoperable, or even missing, an error message is sent from the NAD to the controller (TCU) 12. The controller determines from the error message whether the fault is due to a SIM card error (i.e. the SIM card is not present or is non-functional).

If a SIM card error is detected, the controller 12 determines whether the communication device is in an emergency call, which can not be interrupted. Once the emergency call is completed (or if there is no emergency call), the controller 12 determines whether this is the first time that this error has arisen. If so, the NAD 14 is reset once to see if there was a momentary glitch in the NAD. If not, the NAD 14 (or TCU 12) determines a temperature of the SIM card 16. Temperature can be determined from a separate temperature sensor 26 located in proximity to the SIM card(s) 16 or through other components of the radiotelephone itself, such as through a temperature compensation table for the on-board crystal oscillator for example.

The controller 12 determining whether the temperature of the SIM card 16, measured from the temperature sensor 26, is outside of an operating range of the SIM card 16. For example, SIM cards must be operational within a temperature range of −25° C. to 70° C. At temperature extremes outside of either end of this range, the SIM card may not be operational. However, if it is determined that the temperature is within the normal operational temperature range of the SIM card, this would indicate that there is some other, non-temperature related problem. In this case, The NAD 14 and/or SIM card 16 can be reset and an attempt to read the SIM card repeated. The controller 12 will count the number of reset attempts that are made while the SIM card is non-functional. If the number of reset attempts reaches a predetermined limit (e.g., three to six), then it is assumed that there is some type of irreconcilable problem and a "Unit Not Functional" or "Check SIM Card" message, or the like, can be sent to the user interface 18, requesting a user to intervene to determine the problem. Optionally, once the "Unit Not Functional" or "Check SIM Card" message is sent, the controller can try to get the SIM card working again by attempting to reset it every one minute, for example. This wait time can be any static or dynamic programmable duration.

If it is found that the temperature of the SIM card 16, measured from the temperature sensor 26, is outside of an operating range of the SIM card, then the controller can allow only emergency calls to be made by the NAD, without the operational SIM. Optionally, the controller can send a notice to the user interface 18 indicating that only emergency calls are allowed due to temperature extremes. The controller takes no further action while an emergency call is being made, and will wait until the emergency call is completed. If no emergency call is made, or upon the completion of an emergency call, the controller will attempt to reset the NAD/SIM and proceed to check the SIM function as before. The controller can try to get the NAD/SIM card working again by attempting a reset every one minute, for example, if the communication device is not in an emergency call. The wait time can be any static or dynamic programmable duration.

The controller will also continue to check the temperature in the vicinity of the SIM card. When the temperature returns to the normal operating range of −25° C. to 70° C. (or −15° C. to +60° C. to include a 10° C. buffer for temperature fluctuations for example) the controller will try to reset the NAD/SIM repeatedly, given a one minute wait interval, to attempt to recover normal operation. Alternatively, if the temperature has not changed significantly since the last determination of temperature, it may not be necessary to perform a reset. If the number of attempts reaches a limit (e.g., three to six times), while within this temperature range, the controller can send an optional message to the user interface, such as "Check SIM Card". This is done because the high temperature extremes could have caused permanent damage to the SIM card, its connector, or its holder. Optionally, once the "Check SIM Card" message is sent, the controller can try to get the SIM card working again by attempting to reset it every one minute, for example. The wait time can be any static or dynamic programmable duration.

Figure 2:
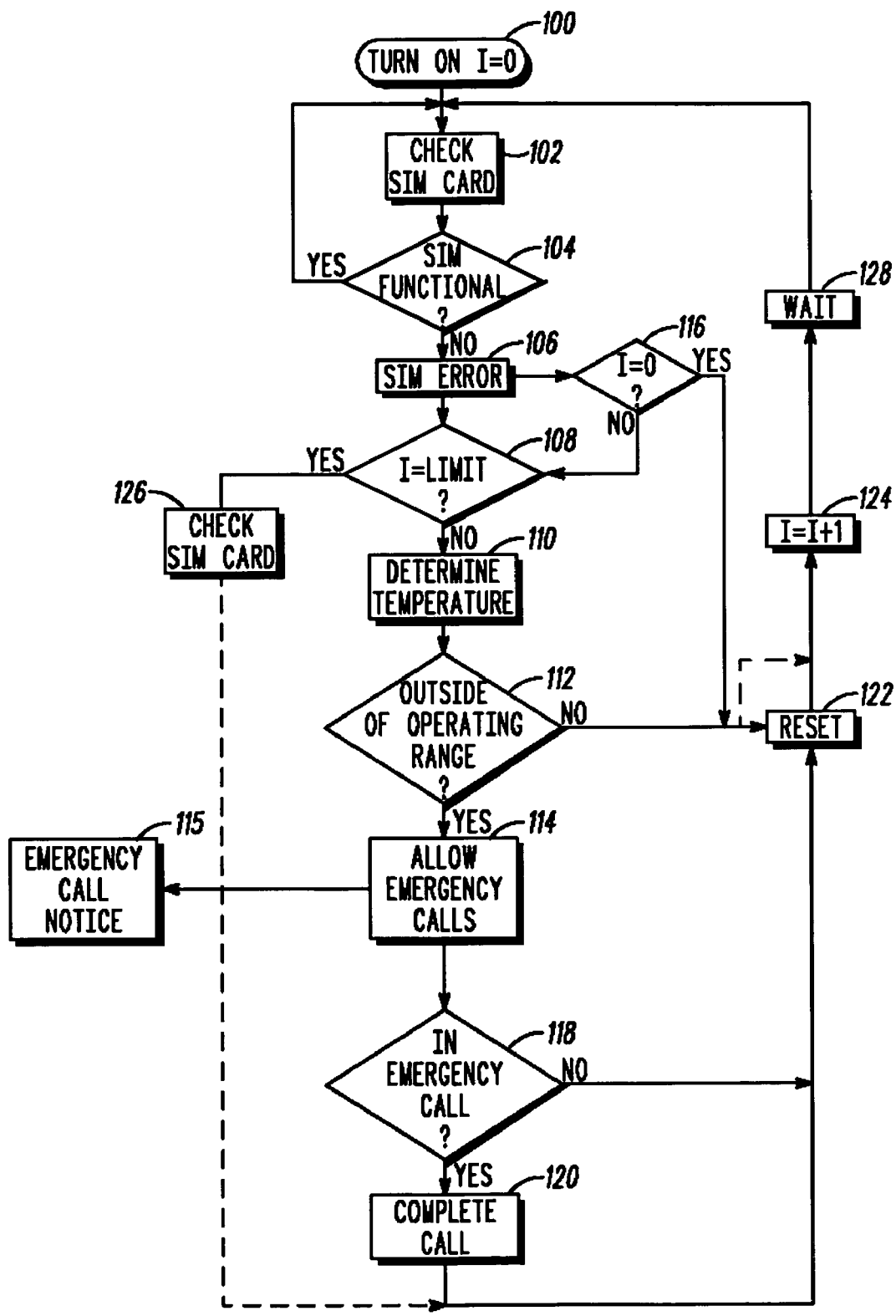
FIG. 2 is a flow chart showing a method, in accordance with the present invention.

Referring to FIG. 2, the present invention also incorporates a method for allowing emergency calling with a Global System for Mobile (GSM) radiotelephone during temperature extremes. A first step in the method is providing a communication device with a user interface and a Subscriber Identification Module (SIM) card. For example, in a vehicular environment, a Telematics Control Unit (TCU) provides control over a GSM Network Access Device (NAD), which provides radiotelephone capabilities for the vehicle. The NAD contains an internal, on-board SIM card that is not generally accessible. A user SIM card can also be used, and the present invention is applicable to both SIM cards. Another example is a portable radiotelephone application, wherein the single SIM card is replaceable. In either case, the SIM card will become non-functional at temperature extremes. Typically, this is because the SIM card deforms so much that it breaks electrical contact with the SIM connector. In addition, the SIM card(s) can stop working due to electrical issues. Temperature detection capabilities are provided for the NAD (or radiotelephone) in the vicinity of the SIM card(s).

In a next step 100, the TCU/NAD (or radiotelephone) is powered on. This step also resets a counter, I.

In a next step 102, the TCU incorporates a periodic function for the NAD that accesses the SIM card. This function can be any simplistic function of the NAD that would require an operational SIM card. For example, the function can be a read or write command to a phonebook location on the SIM. If the function can not be performed, this step detects 104 an error condition, through an error message 106 from the NAD to the TCU, and determines from the error message whether the fault is due to a SIM card error (i.e., the SIM card is not present or is non-functional), which is of particular interest in the present invention. However, if the function can be performed properly by the SIM card (i.e., no SIM error), then this step 102 is periodically repeated.

If a SIM card error is detected 106, this step includes determining whether the communication device is in an emergency call, which can not be interrupted. Once the emergency call is completed (or if there is no emergency call), a next step 116 includes determining whether this is the first time (i.e., I=0) that this problem has arisen. If so, the NAD is reset 122 once to see if there was a momentary glitch in the NAD. If not, a next step 110 includes determining a temperature. Temperature can be determined from a separate temperature sensor located in proximity to the SIM card(s) or through the radiotelephone itself, such as through a temperature compensation table for the on-board crystal oscillator for example.

A next step 112 includes determining whether the temperature, measured from the temperature measuring step 110, is outside of an operating range of the SIM card. For example, SIM cards must be operational within a temperature range of −25° C. to 70° C. At temperature extremes outside of either end of this range, the SIM card may not be operational. However, if it is determined that the temperature is within the normal operational temperature range of the SIM card, this would indicate that there is some other, non-temperature related problem with the SIM. In this case, a RESET command 122 can be sent to the NAD and/or SIM card and this process repeated (steps 102-112). In addition, the counter is incremented 124 to count the number of reset attempts that are made while the SIM card is non-functional. If the number of reset attempts reaches a predetermined limit (e.g. three to six) 108, then it is assumed that there is some type of irreconcilable problem and a "Unit Not Functional" or "Check SIM Card" message 126, or the like, can be sent to a user interface, such as a vehicle display, requesting a user to intervene to determine the problem. Optionally, once the "Unit Not Functional" or "Check SIM Card" message 126 is sent, the TCU can try to get the SIM card working again by attempting to reset 122 it every one minute 128, for example. The wait time 128 can be any static or dynamic programmable duration.

If it is found that the temperature, measured from the temperature measuring step 110, is outside of an operating range of the SIM card 112, then the TCU can allow 114 only emergency calls to be made by the NAD (radiotelephone), without the operational SIM. Optionally, the TCU can send a notification to a user through the user interface 115 (e.g., in-vehicle display) indicating that only emergency calls are allowed due to temperature extremes. The TCU/NAD (radiotelephone) takes no further action while an emergency call is being made 118, and will wait until the emergency call is completed 120. If no emergency call is made 118, or upon the completion of an emergency call 120, the TCU will attempt to reset 122 the NAD/SIM, increment the counter 124, and proceed to check the SIM function 102. The TCU can try to get the NAD/SIM card working again by attempting to reset 122 it every one minute 128, for example, if it is not in an emergency call. The wait time 128 can be any static or dynamic programmable duration.

The TCU will also continue to check the temperature 110 in the vicinity of the SIM card. When the temperature returns to the normal operating range of −25° C. to 70° C. (or −15° C. to +60° C. to include a 10° C. buffer for temperature fluctuations for example) the TCU will try to reset 122 the NAD/SIM repeatedly, given a one minute wait interval 128, to attempt to recover normal operation. Alternatively, if the temperature has not changed significantly since the last determination of temperature, it may not be necessary to repeat the reset command 122. The counter is incremented 124 each time. If the number of attempts reaches a limit (e.g. three to six times) 108, while within this temperature range, the TCU will display 126 an optional message to the user interface, such as "Check SIM Card". This is done because the high temperature extremes could have caused permanent damage to the SIM card, its connector, or its holder. Optionally, once the "Check SIM Card" message 126 is sent, the TCU can try to get the SIM card working again by attempting to reset 122 it every one minute 128, for example. The wait time 128 can be any static or dynamic programmable duration.

It should be recognized that the present invention is applicable to portable and mobile devices. Although a vehicular device was used as an example (utilizing a TCU, NAD, and SIM card(s)), it should be recognized that similar functionality can also exist in a portable device with a processor and SIM card. In addition, the functions of the present invention could easily be incorporated entirely within the NAD, independent of the TCU. The present invention advantageously provides a novel recovery means for a GSM radiotelephone that experiences temperature extremes. The present invention also incorporates emergency calling during such temperature extremes.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for allowing emergency calling with a Global System for Mobile (GSM) radiotelephone during temperature extremes, the method comprising the steps of:

detecting an error condition in a Subscriber Identification Module (SIM) card of the GSM radiotelephone;

measuring a temperature;

determining whether the temperature is outside of an operating range of the SIM card; and allowing emergency calls to be made by the radiotelephone if the temperature is outside of an operating range of the SIM card.

2. The method of claim 1, wherein the detecting step includes periodically checking for proper operation of the SIM card.

3. The method of claim 1, wherein after the detecting step further comprising the step of resetting the radiotelephone once and repeating the detecting step.

4. The method of claim 1, wherein the detecting step includes determining whether the radiotelephone is in an emergency call and then waiting until the call is completed.

5. The method of claim 1, further comprising the step of notifying a user that only emergency calls are allowed.

6. The method of claim 1, further comprising the steps of:
determining whether the radiotelephone is in an emergency call;
waiting until the call is completed; and
resetting the radiotelephone;
waiting a predetermined amount of time; and
repeating the detecting, measuring, determining, allowing, resetting and waiting steps up to a predetermined number of times.

7. The method of claim 6, further comprising the step of sending a failure indication to a user interface of the radiotelephone upon reaching the predetermined number of times.

8. The method of claim 6, wherein, if the measuring and determining step indicate that the temperature has not changed significantly from the last measuring and determining step, the repeating step includes skipping the resetting step.

9. The method of claim 1, wherein measuring the temperature is responsive to detection of an error condition in the SIM card.

10. The method of claim 1, further comprising embedding the radiotelephone in a vehicle.

11. The method of claim 1, wherein allowing emergency calls to be made comprises only allowing emergency calls to be made.

12. A method for allowing emergency calling with a Global System for Mobile (GSM) radiotelephone during temperature extremes, the method comprising the steps of:
periodically checking for an error condition in a Subscriber Identification Module (SIM) card of the GSM radiotelephone;
measuring a temperature upon detection of an error condition;
determining whether the temperature is outside of an operating range of the SIM card;
allowing emergency calls to be made by the radiotelephone if the temperature is outside of an operating range of the SIM card; and
detecting whether the radiotelephone is in an emergency call and then waiting until the call is completed.

13. The method of claim 12, wherein after the detecting step further comprising the step of resetting the radiotelephone once and repeating the checking step.

14. The method of claim 12, wherein the checking step includes detecting whether the radiotelephone is in an emergency call and then waiting until the call is completed.

15. The method of claim 12, the allowing step includes notifying a user that only emergency calls are allowed.

16. The method of claim 12, further comprising the steps of:
resetting the radiotelephone;
waiting a predetermined amount of time; and
repeating all of the previous steps up to a predetermined number of times.

17. The method of claim 16, further comprising the step of sending a failure indication to a user interface of the radiotelephone upon reaching the predetermined number of times.

18. The method of claim 16, wherein, if the measuring and determining step indicate that the temperature has not changed significantly from the last measuring and determining step, the repeating step includes skipping the resetting step.

19. The method of claim 12, wherein allowing emergency calls to be made comprises only allowing emergency calls to be made.

20. An apparatus for allowing emergency calling with a Global System for Mobile (GSM) radiotelephone during temperature extremes, the apparatus comprising:
a Subscriber Identification Module (SIM) card coupled to the GSM radiotelephone;
a temperature sensor; and
a controller being coupled to the temperature sensor and SIM card, the controller periodically checks for a SIM card error, whereupon the controller obtains a temperature measurement from the temperature sensor, wherein if the temperature measurement is outside of an operating temperature range of the SIM card the controller allows the radiotelephone to make an emergency call.

21. The apparatus of claim 20, wherein the controller determines when the radiotelephone is not in an emergency call and attempts to reset the radiotelephone.

22. The apparatus of claim 20, further comprising a user interface coupled to the controller, wherein the controller will signal a user to check the SIM card upon reaching a predetermined number of attempts to reset the SIM card.

23. The apparatus of claim 20, wherein the controller determines when the radiotelephone is not in an emergency call and repeatedly attempts to reset the radiotelephone up to a predetermined number of times before indicating a failure.

24. The apparatus of claim 23, wherein the controller obtains temperature measurements after each reset, wherein if the SIM card is again within an operating temperature range, the controller will skip resets of the radiotelephone as it periodically checks for a SIM card error.

25. The apparatus of claim 20, wherein if the temperature measurement is outside of an operating temperature range of the SIM card the controller allows the radiotelephone to only make an emergency call.

* * * * *